(12) United States Patent
Gassmann et al.

(10) Patent No.: US 9,599,150 B2
(45) Date of Patent: Mar. 21, 2017

(54) BEARING PAD, SUPPORT BODY, BEARING ARRANGEMENT AND PUMP

(71) Applicant: Sulzer Pumpen AG, Winterthur (CH)

(72) Inventors: Simon Gassmann, Zürich (CH); Paul Meuter, Seuzach (CH); Thomas Felix, Zumikon (CH)

(73) Assignee: Sulzer Management AG, Winterthur (CH)

( * ) Notice: Subject to any disclaimer, the term of this patent is extended or adjusted under 35 U.S.C. 154(b) by 0 days.

(21) Appl. No.: 13/865,967

(22) Filed: Apr. 18, 2013

(65) Prior Publication Data

US 2013/0315518 A1 Nov. 28, 2013

(30) Foreign Application Priority Data

Apr. 18, 2012 (EP) .................................... 12164627

(51) Int. Cl.
*F16C 17/06* (2006.01)
*F16C 33/06* (2006.01)
*F04D 29/047* (2006.01)
*F04D 29/057* (2006.01)

(52) U.S. Cl.
CPC ............ *F16C 17/06* (2013.01); *F04D 29/047* (2013.01); *F04D 29/057* (2013.01); *F16C 33/06* (2013.01); *F16C 2206/40* (2013.01); *F16C 2360/42* (2013.01); *F16C 2360/44* (2013.01)

(58) Field of Classification Search
CPC ...... F16C 17/06; F16C 33/06; F16C 2360/40; F16C 2360/42; F16C 2360/44; F04D 29/047; F04D 29/057

USPC ....... 384/117, 122, 224, 306, 307, 308, 309, 384/312

See application file for complete search history.

(56) References Cited

U.S. PATENT DOCUMENTS

| 1,701,078 | A | * | 2/1929 | Layne ........................... 384/308 |
| 1,759,234 | A | * | 5/1930 | Layne ............................. 72/362 |
| 1,882,102 | A | * | 10/1932 | Wallgren ...................... 384/312 |
| 3,655,250 | A | * | 4/1972 | Sprenger ...................... 384/304 |
| 3,829,180 | A | * | 8/1974 | Gardner ....................... 384/306 |
| 3,893,737 | A | * | 7/1975 | Tyson ........................... 384/307 |
| 3,899,221 | A | * | 8/1975 | Batt .............................. 384/308 |
| 4,026,613 | A | * | 5/1977 | Moravchik ................... 384/308 |

(Continued)

FOREIGN PATENT DOCUMENTS

| DE | 853990 C | 10/1952 |
| EP | 0752538 A2 | 1/1997 |

(Continued)

OTHER PUBLICATIONS

European Search Report mailed on Sep. 27, 2012 in European Application No. 12164627.7 filed on Apr. 18, 2012.

*Primary Examiner* — Alan B Waits
(74) *Attorney, Agent, or Firm* — Kilpatrick Townsend & Stockton LLP

(57) ABSTRACT

A bearing pad, including a pad body (11) and a tilting element (12), for a support body (2) of a bearing arrangement (3) for taking up an axial thrust, characterized in that the tilting element (12) is provided in an elongated recess (111) of the pad body (11) extending in a radial direction such that a contact body (121) of the tilting element (12) extending in the direction of the recess (111) projecting beyond a surface of the pad body (11) and the pad body (11) has a higher deformability than the tilting element (12).

21 Claims, 6 Drawing Sheets

(56) References Cited

U.S. PATENT DOCUMENTS

| | | | | |
|---|---|---|---|---|
| 4,039,228 | A * | 8/1977 | Repose | F16C 23/04 |
| | | | | 384/312 |
| 4,077,682 | A * | 3/1978 | Gardner | 384/303 |
| 4,456,391 | A * | 6/1984 | New | 384/307 |
| 4,525,083 | A * | 6/1985 | Pedersen | 384/278 |
| 4,639,146 | A * | 1/1987 | Yoshioka et al. | 384/99 |
| 4,714,357 | A * | 12/1987 | Groth et al. | 384/312 |
| 5,007,745 | A * | 4/1991 | Ball et al. | 384/307 |
| 5,364,192 | A * | 11/1994 | Damm et al. | 384/420 |
| 5,795,076 | A * | 8/1998 | Ball et al. | 384/307 |
| 7,314,313 | B2 * | 1/2008 | Rogalla et al. | 384/117 |
| 7,845,855 | B2 * | 12/2010 | Bischof et al. | 384/117 |
| 8,292,507 | B2 * | 10/2012 | Hirai et al. | 384/117 |
| 8,646,981 | B2 * | 2/2014 | Peterson et al. | 384/306 |
| 2006/0063442 | A1 | 3/2006 | Taylor | |
| 2006/0193543 | A1 * | 8/2006 | Geiger | 384/309 |
| 2007/0110561 | A1 * | 5/2007 | Ide et al. | 415/104 |
| 2010/0215299 | A1 * | 8/2010 | Waki et al. | 384/307 |
| 2010/0260451 | A1 * | 10/2010 | Wilkes | 384/619 |
| 2011/0019950 | A1 * | 1/2011 | Hirai et al. | 384/308 |
| 2013/0182980 | A1 * | 7/2013 | Peterson et al. | 384/306 |

FOREIGN PATENT DOCUMENTS

| | | | |
|---|---|---|---|
| FR | 540027 | A | 7/1922 |
| FR | 554735 | A | 6/1923 |
| GB | 1219572 | A | 1/1971 |
| GB | 1535165 | A | 12/1978 |

\* cited by examiner

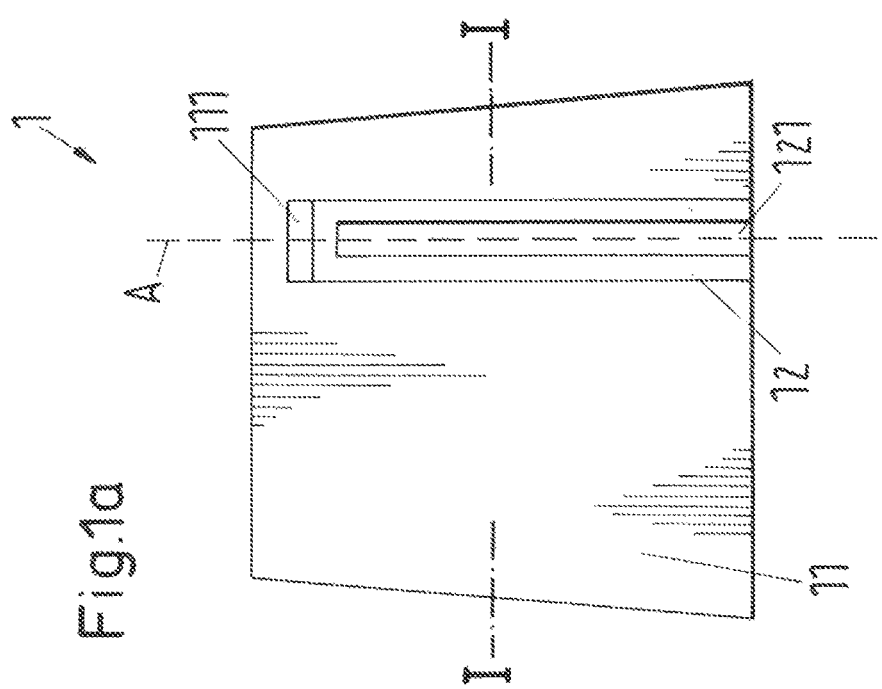

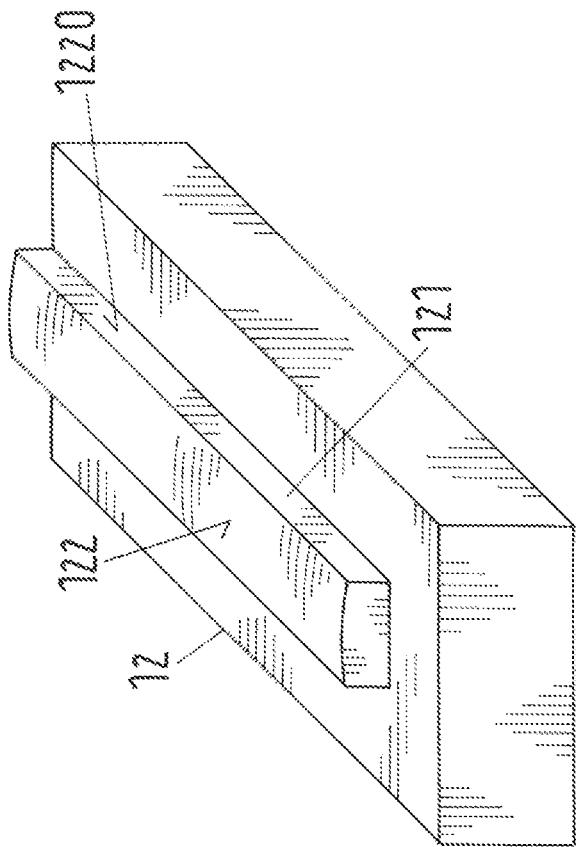
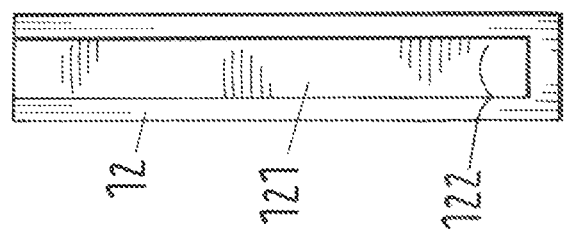

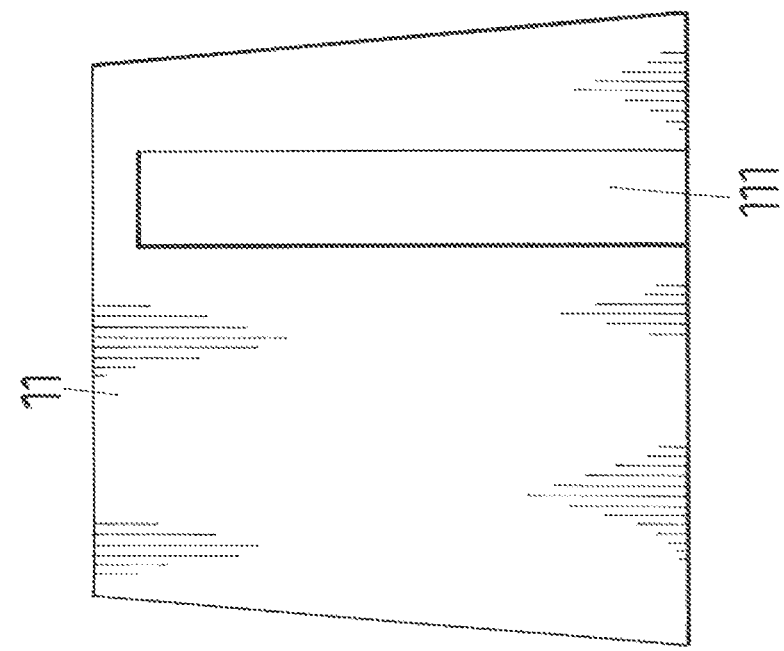
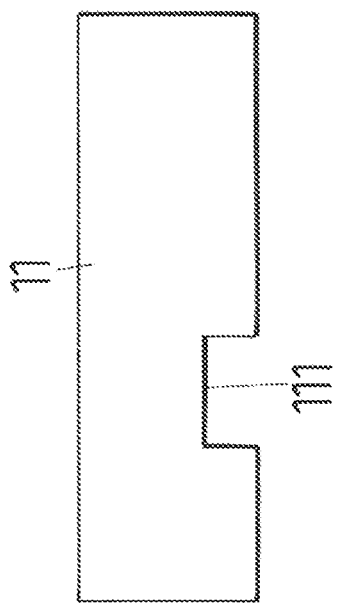

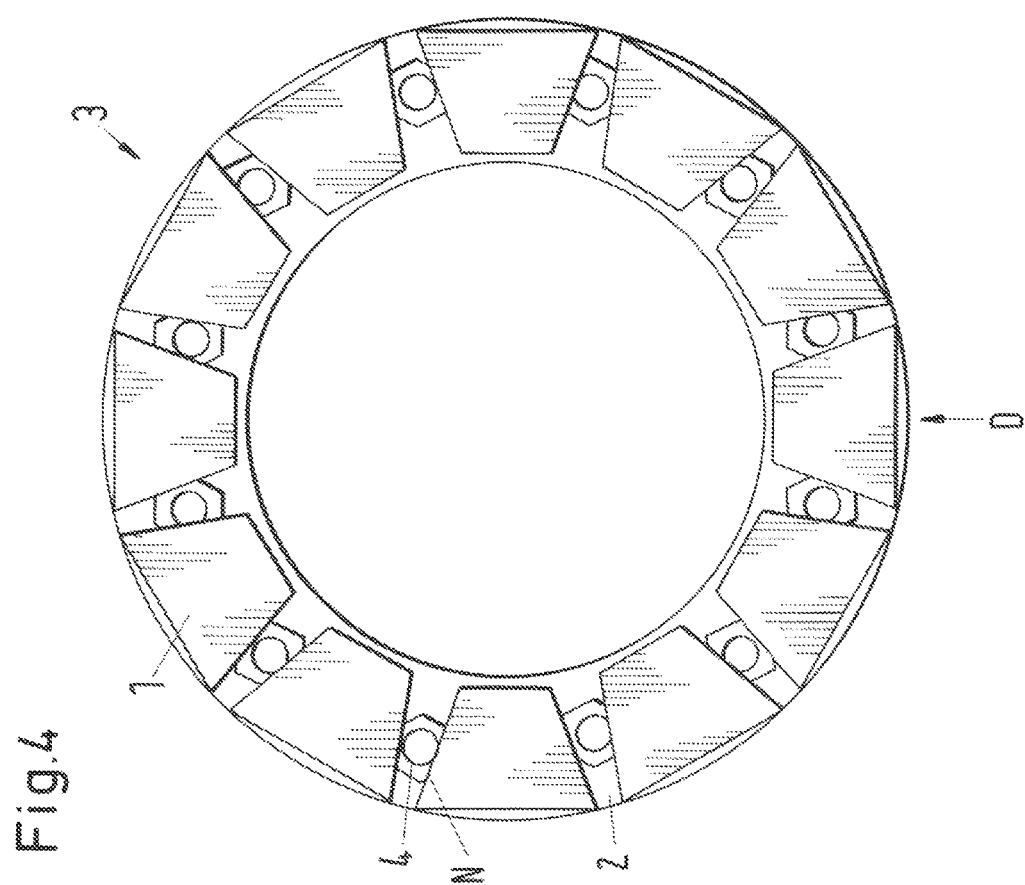

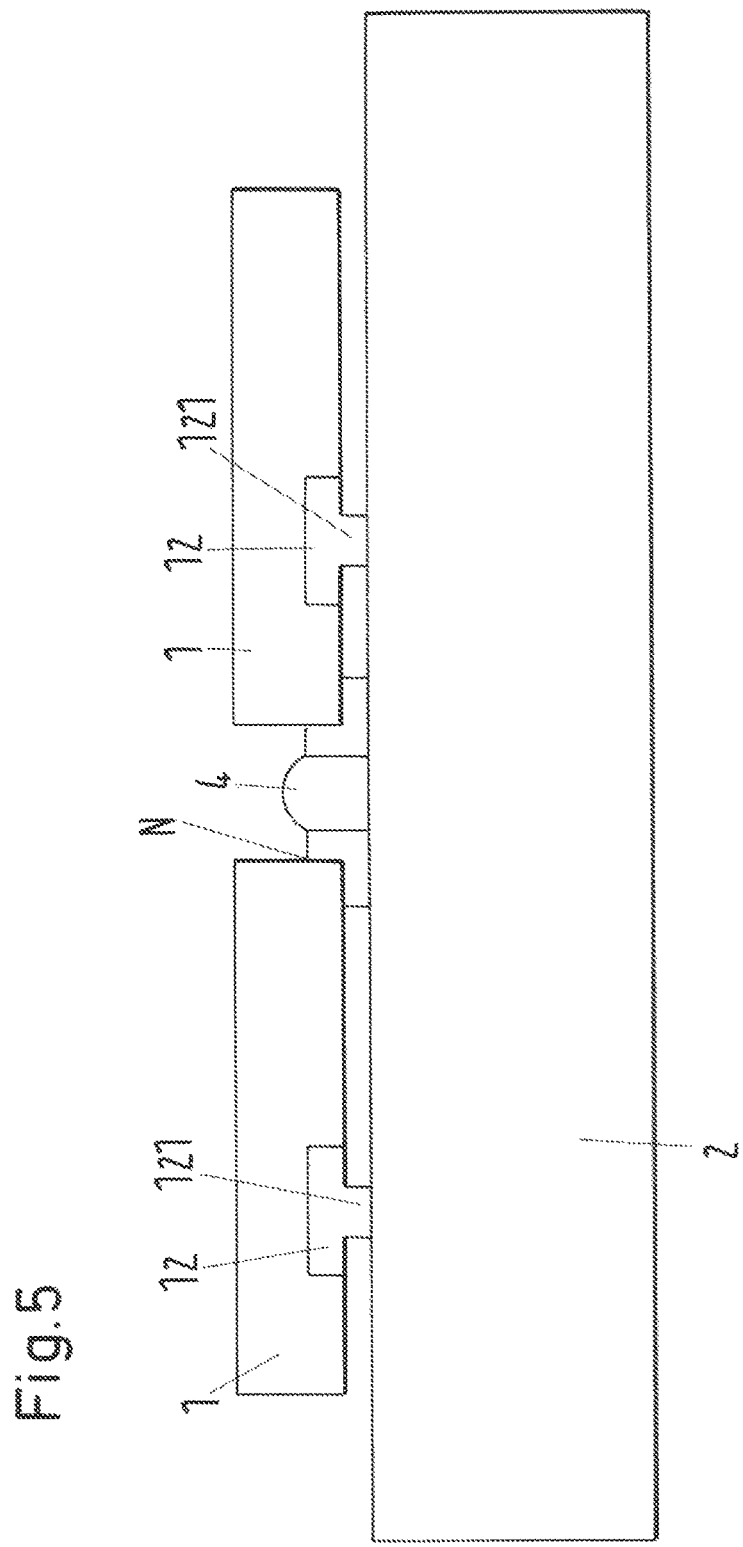

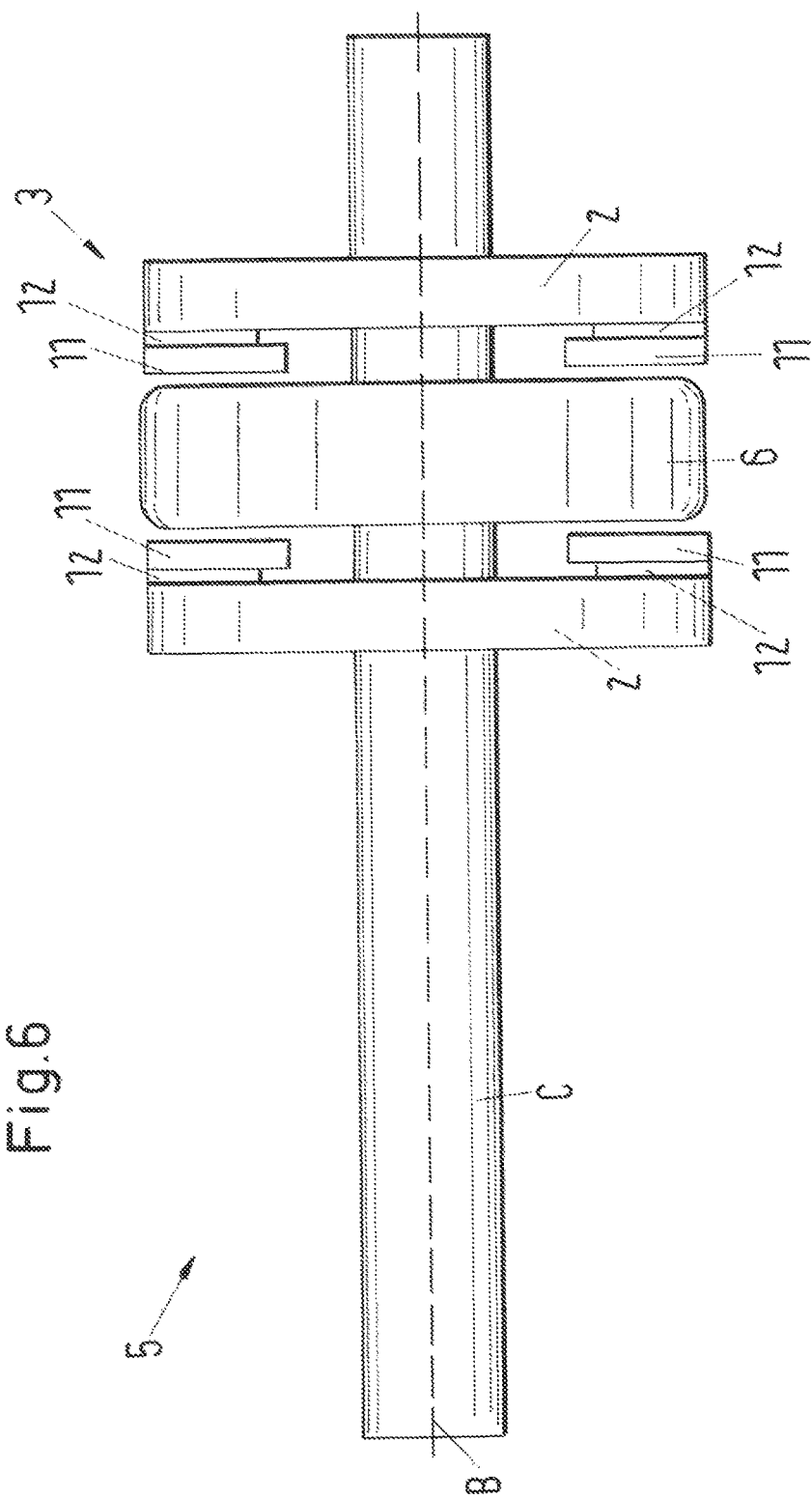

BEARING PAD, SUPPORT BODY, BEARING ARRANGEMENT AND PUMP

This application claims priority to European Application No. 12164627.7 filed on Apr. 18, 2012, the disclosure of which is incorporated by reference herein.

The invention relates to a bearing pad, including a pad body and a tilting element, for a support body of a bearing arrangement for taking up an axial thrust, to a support body of a bearing arrangement, to a bearing arrangement and to a pump in accordance with the preambles of the independent claims 1, 11, 14 and 15.

Bearings are used whenever forces acting in specific directions have to be compensated or where movements of an object in the unwanted directions have to be prevented. Essentially two types of bearings are used in pumps in this respect, radial bearings and thrust bearings.

Axial tilting pad thrust bearings are usually used to take up axial forces whose design is known from the prior art. The general design principle provides that a plurality of bearing pads in the form of a ring-shaped grouping are arranged on a usually metallic support body about a bearing axis in a axial tilting pad thrust bearing and are flooded with a circulating fluid as a lubricant. The bearing pads per se are composed of a metal, plastic, etc. in dependence on the use and have the shape of a trapezoidal parallelepiped on whose side facing the support body a tilting element is located on which the bearing pad is supported. On the side of the bearing pads remote from the support body, a thrust collar is located by which the axial forces of the shaft are transmitted to the bearing, whereby corresponding pressure loads act on the bearing pads.

When the thrust collar starts to rotate, a shearing of the fluid takes place between the thrust collar and the bearing pads and the thrust collar slides over the bearing pads. The forming of a wedge-shaped hydrodynamic lubricant film, which is an essential component in the operation of the thrust bearing arrangement, results in a tilting of each bearing pad since they are supported on a tilting element. The start phase and the stop phase are particularly critical operating ranges for the axial tilting pad thrust bearings, for example in pumps, since very high axial forces act in part in this respect. In these phases, the hydrodynamic lubricant film has not yet fully formed so that the thrust collar and the bearing pad contact one another directly without substantial hydrodynamic lubrication and wear occurs.

The bearing pads are generally mounted loosely and discretely with respect to the support body to avoid misalignments and to match the tilting of the bearing pads, which is effected by the formation of the hydrodynamic lubricant film, to the rotating shaft. The loose mounting is in this respect restricted in principle in that the bearing pads have to be held within the arrangement when the shaft does not rotate, that is for example in that the bearing pads are connected to one another by a flexible net or are fastened in a groove at the support body by means of a fastening means.

Bearing pads are known from the prior art which are composed of a unit having a pad body and a tilting element and, as described above, the pad body has the form of a trapezoidal parallelepiped. The bearing pad is supported on the support body by the tilting element located on the surface of the bearing pad facing the support body, with a preferred tilting axis lying in the radial direction of the bearing axis.

The most varied materials are also known from the prior art from which the bearing pads are manufactured. Usually, the bearing pads are manufactured from metal, for example from steel or white metal, and are coated, if required for the application, with a material, e.g. with the plastic polyetheretherketone (PEEK). Since this is very complex, single-piece bearing pads, e.g. bearing pads manufactured completely from PEEK, are frequently used which admittedly have the advantage of a higher deformability and thereby a better load distribution (and thus higher permitted specific pressure loads), but which have the disadvantage that the material can start to flow, that is deforms plastically, in the region of the tilting elements.

In dependence on the site environment of use, fluids having a low viscosity are used in part, for example a water-based lubricant or an oil/water mixture having a high water portion. In this case, the wear of the bearing pads is not a constant process, but damage to or destruction of the bearing pads often occurs within seconds at high pressure loads. For this reason, bearing pads from other materials are used, for example bearing pads of ceramic materials or of thermoplastic. Ceramic materials are hard, but brittle, but have the advantage that they can be used in environments with a lubricant with a low viscosity. There are, however, practical disadvantages on the use of ceramic materials; they frequently require additional manufacturing steps which are complex with ceramic materials and which usually damage the entire bearing or destroy it when the bearing pads disintegrate into a plurality of parts due to the brittleness. Bearing pads of thermoplastic, in contrast, admittedly have a higher elasticity and a smaller brittleness, whereby they can take up higher pressure loads. However, they have the disadvantage that the material starts to flow on excessive loading at the tilting elements, as already mentioned.

An arrangement for an axial tilting pad thrust bearing is known from DE 698 14 620 in which spring elements are provided on which the tilting elements of the bearing elements are supported and which can compensate high pressure loads on start-up. The bearing pads are in this respect arranged at a support body which includes at least two ring-shaped axially flexible spring elements which are each spaced apart from an adjacent ring-shaped surface by an associated circular grouping of bending joints. The joints are in this respect each arranged between the tilting elements of adjacent bearing pads and act as an engagement point for spring bending. The disadvantage of this solution is the high design and technical production effort since the complexity of the arrangement is increased by a multiple in comparison with usual axial tilting pad thrust bearings.

It is therefore the object of the invention to provide bearing pads having a simple construction design which are suitable for a simple and cost-effective manufacture and which can be simultaneously used in an thrust bearing arrangement for taking up high pressure loads, with the damaging effects known from the prior art being avoided.

The subject matters of the invention satisfying this object are characterized by the features of the independent claims 1, 11, 14 and 15.

The dependent claims relate to particularly advantageous embodiments of the invention. In accordance with the invention, a bearing pad including a pad body and a tilting element is therefore proposed for a support body of a bearing arrangement for taking up an axial thrust. The tilting element is provided in an elongated recess of the pad body extending in a radial direction such that a contact body of the tilting element extending in the direction of the recess projects beyond a surface of the pad body and the pad body has a higher deformability than the tilting element.

It is thus essential for the invention that the bearing pad has a tilting element which is provided in a recess in the pad body, that the tilting element has a contact body which projects beyond a surface of the pad body and that the deformability of the pad body is higher than that of the tilting element. The advantage of this design is that due to the arrangement in the recess, the tilting element can better transmit the forces applied to the pad body or can be loaded with higher pressure loads. In addition, it is possible for the first time due to the invention to select materials having a different deformability with advantageous material properties for the components so that the bearing pad is matched to the demands of the respective embodiment. It thereby becomes possible to configure bearing pads in a simple construction design, to manufacture them with existing efficient production processes and simultaneously to extend the spectrum of use due to the different material properties of a bearing pad in accordance with the invention.

Analogously, in different words again, the essential aspect of the invention is that the bearing pad includes two different materials for the support body and for the tilting element and thus the advantage of the high deformability of the support body is combined with the advantage of the "non-flowing" of the tilting element.

In addition, it is thus possible to mass produce bearing pads for the most varied application areas by the use of different tilting elements. For this purpose, only the material from which the tilting elements are manufactured has to be changed, which is in particular advantageous with respect to economy.

Since the pad body preferably has a higher deformability than the tilting element, it is possible to use pad bodies having a high deformability and simultaneously to configure the tilting element from another material, a material which has a small deformability. The pad body can compensate a high pressure load by this measure and the tilting element can transmit high pressure loads without flowing.

A further advantage is that the forces are distributed over a larger surface due to the larger surface of the recess and the pressure loads thereby become lower, whereby the material load of the bearing element is considerably reduced. If the pad body is additionally composed of a material having a higher deformability, it is then only elastically deformed by the applied pressure load. It can easily be seen that the wear is reduced or the service life of a bearing element and thus the economy are significantly increased due to this measure.

The bearing element, including the pad body and the tilting element, is preferably a two-part bearing pad. This preferred embodiment makes it possible to configure the bearing pad as a bearing pad including two or more independent components. Due to the separation of the components, that is into components which are composed of materials having a different deformability, it is possible to combine the material properties efficiently. Due to the simple design features of the pad body and of the tilting element, known manufacturing processes can thus be used, with two-part bearing pads being able to be manufactured particularly simply and flexibly for the first time. In addition, the replacement of wear parts is simplified due to the present construction solution.

It is furthermore advantageous that the tilting element of the bearing pad is of a metal. Since the bearing pads in accordance with the invention are used, for example, in pumps having low-viscosity lubricants and since tilting elements having a small plastic deformability are used in this area, but since simultaneously the pad bodies have to be components having a high elastic deformability, the bearing pad in accordance with the invention can be configured with a tilting element of metal and with a pad body of a different material.

As a specific measure, a contact surface of the contact body is coated, in particular ceramically coated. The wear of the contact surface which is contacted by the support body in the installation state and in the operating state, and which is a region having an extreme load, is advantageously reduced by this measure.

It is advantageous with respect to the property of the tilting to configure the contact body of the bearing pad such that it can be arranged movable about a tilting axis at the support body in the installed state. As a preferred measure, the tilting axis is arranged in the radial direction. A further advantageous measure and preferred embodiment provides that a cross-section of the contact body is convexly arched and is in particular polygonal.

It can easily be seen that the contact body of the bearing pad has to be designed such that the bearing pad in the installed state, that is the bearing elements arranged at the support body, tilt about a tilting axis in the installed state. The tilting axis about which the bearing pad is tilted, extends in the radial direction, that is in the direction of the recess. This radial direction advantageously corresponds to the radial direction of the bearing axis in the installed state so that the tilting elements of the bearing pads are automatically aligned in the preferred direction.

In a particularly preferred embodiment of the bearing pad, the material from which the pad body is made is a fiber-reinforced composite or a thermoplastic, in particular a polyetheretherketone. Completely new embodiments of bearing pads can thus be manufactured, in particular in combination with tilting elements of metal, which can take up high pressure loads without showing wear phenomena in comparison with bearing pads which are known from the prior art.

The cross-section of the recess in the pad body of the bearing pad is preferably polygonal, in particular quadrangular, and/or the tilting element is fastened in the recess of the pad body by a fastening means. In practice, the fastening of the tilting element in the recess takes place, for example, by means of latching, clipping or adhesive bonding or by means of clamping, pressing or screwing.

The invention further relates to a support body of a bearing arrangement for taking up an axial thrust having a bearing pad. In a particularly preferred embodiment, the support body can be arranged about a bearing axis, and can in particular be arranged in a ring shape, and/or a plurality of bearing pads are arranged at the bearing body, and are in particular arranged in a ring-like manner.

The invention further relates to a bearing arrangement having a support body and a bearing pad.

The invention finally also relates to a pump having a bearing arrangement, a bearing body and a bearing pad.

The invention will be explained in more detail in the following with reference to the drawing. There are shown in a schematic representation:

FIG. 1a a bearing pad in accordance with the invention;

FIG. 1b a cross-section along the line I-I in accordance with FIG. 1a;

FIG. 2a a tilting element in accordance with the invention;

FIG. 2b the tilting element in accordance with the invention of FIG. 2a in a perspective representation;

FIG. 3a a bearing pad in accordance with the invention with a recess;

FIG. 3b a cross-section through the bearing pad in accordance with the invention of FIG. 3a;

FIG. 4 a support body in accordance with the invention with a plurality of bearing pads;

FIG. 5 a side view in accordance with FIG. 4 from a direction D of the support body in accordance with the invention with an arrangement of bearing pads; and FIG. 6 a schematic representation of an embodiment of a pump with a bearing arrangement in accordance with the invention.

Only an embodiment is shown by way of example in the Figures. The skilled person, however, easily understands, also without the explicit representation in a drawing, how further embodiments in accordance with the invention can be realized in a completely analog manner. A particularly preferred embodiment of a bearing pad in accordance with the invention will be discussed in the following with reference to FIG. 1a and FIG. 1b, which is designated as a whole by reference numeral 1.

The bearing pad in accordance with the invention, which includes a pad body 11 and a tilting element 12, is used generally and in particular in the specific embodiment of FIG. 1a and FIG. 1b as a bearing pad 1 at a support body (not shown here) of a bearing arrangement (not shown here) for taking up an axial thrust. In accordance with the invention, a tilting element 12 is provided in an elongated recess 111 of the pad body 11 extending in a radial direction such that a contact body 121 of the tilting element 12 extending in the direction of the recess 111 projects beyond a surface of the pad body 11 and the pad body 11 has a higher deformability than the tilting element 12.

FIG. 1b shows, analog to FIG. 1a, the cross-section through such a bearing element 1 in accordance with the invention which includes the pad body 11 with the recess 111 and in the recess 111 the tilting element 12 with the contact body 121. It can clearly be seen how the contact body 121 projects beyond a surface of the pad body 11 and with which the tilting element 12 can be arranged at the support body (not shown here).

The bearing pad 1 in accordance with the invention, which includes a pad body 11 and a tilting element 12, is a two-part bearing pad 1 and thus has the advantage over a conventional bearing pad 1 that it takes up larger pressure loads due to the construction design of the recess 111 and of the tilting element 12 and the pad body 11 has a higher deformability. The embodiment shown in FIGS. 1a and 1b can thus be matched particularly advantageously to the demands of an application in that the corresponding materials are selected for the pad body 11 and the tilting element 12. It thereby becomes possible to configure bearing pads 1 in a simple construction design, to manufacture them using known efficient production processes and simultaneously to extend the application spectrum of bearing pads by the use of different materials.

FIG. 1a additionally shows that the contact body 121 is designed such that the bearing pad 1 can be arranged in contact with the contact body 121 movable about a tilting axis A at the support body (not shown here) in the installed state. The tilting axis A is in this respect arranged in the radial direction, that is in the direction of the recess 111, which corresponds, for example, to the radial direction of the bearing axis (not shown here) in the installed state.

The embodiment shown schematically in FIG. 2a and FIG. 2b shows tilting elements 12 in accordance with the invention from a plan view or in a perspective representation. The tilting element 12 is preferably of metal and is arranged in the recess (not shown here) so that a flowing, that is a plastic deformation, of the tilting element 12 can also be precluded at large pressure loads. A particularly preferred embodiment in this respect provides a bearing pad (not shown here) whose pad body (not shown here) has a higher deformability than the tilting element 12 of metal so that a two-part bearing pad (see FIG. 1a and FIG. 1b) can be manufactured which has the advantage that its tilting element 12 has a smaller deformability and a pad body 11 whose elastic properties make it possible additionally to compensate pressure load.

A specific measure is to coat a contact surface 122, 1220 of the contact body 121, in particular to ceramically coat it. The friction coefficient of the contact surface 120, 1220 of the tilting element 12 can thereby e.g. be reduced so that the total contact body 121 has smaller wear phenomena and a longer service life.

The cross-section of the contact body 121 is convexly arched, and is in particular polygonal, as can be seen with reference to the embodiment in FIG. 2b.

An embodiment of a pad body 11 with the recess 111 is shown in FIGS. 3a and 3b, with the material from which the pad body 11 is made here being a fiber-reinforced composite material or a thermoplastic, in particular a polyetheretherketone. The named materials are preferably used since they have the already mentioned higher deformability, that is a higher elasticity, and can compensate higher pressure loads.

The shape of the cross-section of the recess 111 in the pad body 11 is preferably polygonal, and is in particular preferably quadrangular as shown in the present embodiment in FIG. 3a and FIG. 3b, whereby the tilting element (not shown here) transmits the axial forces in the recess 111 to a larger surface and the pressure loads thus become smaller.

The tilting element (not shown here) is fastened in the recess 111 of the pad body 11 by a fastening means, in particular by means of clipping, adhesive bonding, latching or screwing, pressing or clamping.

FIG. 4 shows a support body in accordance with the invention of a bearing arrangement 3 for taking up an axial thrust with an arrangement of bearing pads 1. The bearing pads 1 are held at the support body 2 by means of a fastening means 4, for example a nut which holds the bearing pad 1 in a groove N at an outer margin. In FIG. 5, a cross-section through a support body 2 in accordance with the invention is shown with an arrangement of bearing pads 1, with the shown embodiment substantially corresponding to the embodiment shown in FIG. 4.

In FIG. 6, a schematic representation of an embodiment of a pump is shown with a bearing arrangement 3, a support body 2 and a bearing pad 1, with only the part of the pump 5 relating to the invention being shown, a bearing arrangement 3 with support bodies 2 and bearing pads 1. Overall, two support bodies 2 of a bearing arrangement 3 are arranged so that the bearing pads 1 are oppositely disposed, A thrust collar 6 which transmits the pressure load is arranged between the two support bodies 2. The support bodies 2 are usually arranged about a bearing axis B of a shaft C, and are in particular arranged in ring shape, as in the present embodiment. The plurality of bearing pads 1 which are arranged at the support body 2 are also schematically indicated, with the bearing pads 1 being arranged in ring-like form in the present embodiment.

The invention claimed is:

1. A bearing pad, comprising:
 a pad body comprising a thermoplastic and defining an elongated recess extending in a radial direction; and
 a tilting element disposed in the elongated recess of the pad body and comprising a contact body, wherein the contact body projects beyond a surface of the pad body, wherein the tilting element has a planar contact surface configured to rest on the elongated recess of the pad body, and wherein the tilting element has a lower elasticity than the pad body, further wherein the tilting element has a recess contact surface opposite the pad surface, the recess contact surface configured to rest in the elongated recess, the contact body extending from the pad surface, the contact body having parallel opposing first and second side walls that extend parallel with the elongated recess, the parallel side walls extend transverse from the pad surface a predetermined distance, and wherein the distance between the first and second sidewalls is less than the width of pad surface.

2. A bearing pad in accordance with claim 1, wherein the bearing pad, including the pad body and the tilting element is a two-part bearing pad.

3. A bearing pad in accordance with claim 1, wherein the tilting element is comprised of a metal.

4. A bearing pad in accordance with claim 1, wherein the tilting axis is arranged in the radial direction.

5. A bearing pad in accordance with claim 1, wherein a contact surface of the contact body is coated.

6. A bearing pad in accordance with claim 5, wherein the contact surface is ceramically coated.

7. A bearing pad in accordance with claim 1, wherein a cross-section of the contact body is convexly arched.

8. A bearing pad in accordance with claim 7, wherein the contact body is polygonal.

9. A bearing pad in accordance with claim 1, wherein the material from which the pad body is made, includes a fiber-reinforced composite material.

10. A bearing pad in accordance with claim 9, wherein the material from which the pad body is made is polyetheretherketone.

11. A bearing pad in accordance with claim 1, wherein a cross-section of the recess in the pad body is polygonal.

12. A bearing pad in accordance with claim 11, wherein a cross-section of the recess in the pad body is quadrangular.

13. A bearing pad in accordance with claim 1, wherein the tilting element is fastened in the recess of the pad body by a fastening means.

14. A support body of a bearing arrangement for taking up an axial thrust having a bearing pad in accordance with claim 1.

15. A support body in accordance with claim 14, wherein the support body can be arranged about a bearing axis.

16. A support body in accordance with claim 15, wherein the support body can be arranged in ring shape.

17. A support body in accordance with claim 14, wherein a plurality of bearing pads are arranged at the support body.

18. A support body in accordance with claim 17, wherein the plurality of bearing pads are arranged in ring shape.

19. A bearing arrangement having a support body in accordance with claim 14.

20. A bearing pad in accordance with claim 1, wherein the pad body is made of fiber reinforced composite or a thermoplastic material.

21. A bearing pad, including a pad body and a tilting element, for a support body of a bearing arrangement for taking up an axial thrust, wherein the tilting element is provided in an elongated recess of the pad body extending in a radial direction such that a contact body of the tilting element extending in the direction of the recess projects beyond a surface of the pad body and the pad body has a higher deformability than the tilting element and wherein the material from which the pad body is made includes a thermoplastic, wherein the pad body has a first edge and a second edge opposite the first edge, and wherein the elongated recess extends from the first edge and partially along the pad body toward the direction of the second edge.

* * * * *